United States Patent [19]
Posma

[11] Patent Number: 6,157,148
[45] Date of Patent: Dec. 5, 2000

[54] CONTACTORLESS MULTI-MOTOR CONTROLLER FOR BATTERY-POWERED VEHICLES

[75] Inventor: Bonne W. Posma, Fort Meyers, Fla.

[73] Assignee: Saminco, Inc., Fort Meyers, Fla.

[21] Appl. No.: 09/364,188

[22] Filed: Jul. 30, 1999

[51] Int. Cl.[7] ................................ B60L 15/00; H02P 7/68
[52] U.S. Cl. ................................ 318/49; 318/51; 318/139; 318/293
[58] Field of Search ..................... 318/34, 49, 50, 318/51, 53, 54, 55, 59, 66, 67, 101, 139, 280, 287, 291, 293

[56] References Cited

U.S. PATENT DOCUMENTS

| | | | |
|---|---|---|---|
| 3,575,648 | 4/1971 | Ridding | 318/106 |
| 3,727,118 | 4/1973 | Makino et al. . | |
| 3,809,975 | 5/1974 | Bartels | 318/39 |
| 3,898,937 | 8/1975 | Johnson | 105/61 |
| 4,196,377 | 4/1980 | Boxer . | |
| 4,282,465 | 8/1981 | Acker et al. | 318/139 |
| 4,385,266 | 5/1983 | Sloan . | |
| 4,406,979 | 9/1983 | Sloan . | |
| 5,070,283 | 12/1991 | Avitan . | |
| 5,132,600 | 7/1992 | Kiroshita et al. . | |
| 5,332,954 | 7/1994 | Lankin | 318/139 |
| 5,875,281 | 3/1999 | Thexton et al. . | |

Primary Examiner—Bentsu Ro
Attorney, Agent, or Firm—Andrew G. DiNovo; Vinson & Elkins

[57] ABSTRACT

A contactorless multi-motor controller is described which comprises a contactorless pump motor starter and a contactorless, reversible traction motor controller. The two controllers are mutually interactive. When the pump motor has ramped up to full voltage, a function block on-board said pump motor control circuit detects this condition and enables the tramming operation of the traction motor.

19 Claims, 6 Drawing Sheets

CONTACTORLESS MULTI-MOTOR CONTROLLER FOR BATTERY-POWERED VEHICLES

FIELD OF THE INVENTION

This invention relates to contactorless control of DC motors without speed-sensing transducers onboard battery-powered vehicles containing one or more conventional, four-terminal, series-wound DC traction motors, and one or more DC auxiliary motors such as a pump motor or compressor motor.

BACKGROUND OF THE INVENTION

Battery-operated vehicles used in mining, for example coal hauling scoops, commonly use one or more series wound DC motors for traction and a compound wound DC motor to drive a hydraulic pump. In such vehicles, the traction motor(s) may not be engaged unless the pump is running at full speed.

Prior to 1980, most traction and pump motor controls for battery-powered vehicles consisted of combinations of resistors and contactors. In the late 1970's, solid-state controllers using SCR's (note that "SCR" and other terms of art are defined following the Detailed Description of the invention), MOSFETS's and BJT's became available but most of these were unreliable, complex and insufficiently powerful for many mining applications. In the early 1990's, more reliable traction motor controllers using newly developed IGBT's became available. Most of these controllers use a single IGBT-based current controller with reversing mechanical contactors to control conventional 4 terminal series wound DC traction motors. More recently, a contactorless reversible IGBT-based motor controller has been produced, using a specially made, dual field series wound "three terminal" DC motor.

U.S. Pat. No. 3,727,118, issued on Apr. 10, 1973, to Makino et al. describes a contactorless reversible controller comprising a load driving circuit including a pair of push-pull circuits formed of bipolar transistors for a three-terminal DC motor. Makino ct al. requires a specially manufactured, three-terminal DC motor, and is inoperable in connection with conventional four-terminal DC traction motors.

U.S. Pat. No. 4,196,377, issued on Apr. 1, 1980 to Trevor C. Boxer, describes an electric vehicle traction motor control circuit including separate armature and field current controls. Boxer uses a speed transducer for motor RPM feedback, unlike some embodiments of the present invention.

U.S. Pat. No. 4,385,266, issued on May 24, 1983, and U.S. Pat. No. 4,406,979, issued on Sep. 27, 1983, both to Sloan, describe a contactorless reversible controller for a three terminal DC motor comprising two thyristor-based static switching devices operated to simultaneously energize their associated fields so as to reduce the next flux in the motor and further increase the motor speed. Like Makino et al., Sloan requires a specially manufactured, three-terminal DC motor, and is inoperable in connection with conventional four-terminal DC traction motors.

U.S. Pat. No. 5,070,283, issued on Dec. 3, 1991 to Avitan, describes a system for controlling separately excited shunt-wound DC motors where control is achieved through microprocessor-based independent PWM control of a chopper (armature) and an H-bridge (field). A contactor is used to by-pass the armature transistor chopper under certain conditions. Avitan is thus reliant upon contactors and does not suggest the contactorless multi-motor controller according to the claimed invention.

The electromechanical contactors required in the prior art are bulky, and are high maintenance items, negating, to a certain degree, the improved reliability gained by the use of the IGBT-based controller. Present solid-state traction motor controllers, associated contactors, and pump starters are supplied in component form and the original equipment manufacture (OEM) or rebuilder of the battery-powered equipment must then mount and wire these components inside the vehicle's enclosure. This is a costly and time-consuming task, and requires the services of an experienced, skilled technician. Moreover, where these components are mounted on-board a battery-operated railed vehicle such as a mining portal bus or locomotive, the components are exposed and can easily be damaged. If the controller fails in use, it is difficult to trouble-shoot, and requires the services of a skilled technician, idling the vehicle until one or more of the defective components are identified and replaced.

The controllers for the three-terminal series wound DC motors referred to in the prior art require motors which are expensive, non-standard, and not readily available.

Controllers requiring speed transducers are not suitable for mining application because they are fragile, require non-conventional motors, and must have prior safety agency approval before use in underground mining.

Existing embodiments of traction motor controllers and pump starters using separately mounted components use up considerable space, which is a significant disadvantage when these components must be housed inside the limited confines of explosion proof enclosures, such as is required for battery-powered vehicles operating near the face of a coal mine.

Moreover, many of the prior art components, most notably the contactors and resistors, are too large, and generate too much heat to allow fitting inside a single, portable compact enclosure which is easy to handle and change out.

OBJECTS OF THE INVENTION

It is an object of the invention to provide a contactorless controller for a conventional four terminal series wound DC traction motor without speed sensing transducers on-board a battery-powered electric vehicle.

It is a further object to provide a solid state starter for the hydraulic pump DC motor on board said vehicle and thereby eliminate the starting resistor and starting contactors commonly used.

It is another object of the invention to configure the control of the starter and controller so that they communicate and are mutually interactive.

It is yet a further object of the invention to package these two solid state controllers inside one compact, portable enclosure which is easy to handle and change out.

It is still another object of the invention to package the controller in such a fashion that it is not easily damaged during transportation.

Yet another object of the invention is to provide speed control and/or ON/OFF control for the pump motor to conserve battery energy during the time that the vehicle is idle.

It is a further object of the invention to provide a multi-motor controller that can be easily and economically retrofitted into older vehicles containing DC motors of standard design.

SUMMARY OF THE INVENTION

The present invention relates to contactorless multi-motor control of at least one four-terminal, series-wound DC motor and at least one two-terminal, compound-wound Auxiliary Motor such as a DC pump motor. The multi-motor controller includes at least two subassemblies: a) a contactorless pump motor starter, and b) a contactorless, reversible traction motor controller. The two subassemblies may be functionally interactive, as described herein.

The contactorless pump motor controller includes first and second connecting terminals to a two terminal compound wound DC pump motor. The first terminal connects the pump motor to the positive side of a DC source. The second terminal connects the pump motor to the collector of an IGBT via a first DC current transducer.

Said IGBT's emitter is connected to the negative side of said DC source and is controlled by means of an on-board pre-programmed starting current command function module. Motor current feedback is provided by said first DC current transducer. A first diode connected across the motor terminals has its cathode connected to the positive side of said DC source and provides a free-wheel current path. When the pump motor has ramped up to full voltage, a function block on-board said pump motor control circuit detects this condition to cause an "up to speed" small-signal relay switch to close. Said small-signal relay switch enables the traction motor controller for tramming operations.

The contactorless traction motor controller includes a first and second half-bridge. The first half-bridge consists of a top and bottom IGBT and the second half-bridge consists of a top and bottom SCR. The collector of the top IGBT of the first half-bridge and anode of the top SCR of the second half-bridge are connected together to a terminal connected to the second field terminal of the four terminal series wound DC motor. The IGBT's in the first half-bridge control current by way of PWM action, and the SCR's of the second half-bridge switch current direction and are connected to be switched ON to conduct armature current direction appropriate to the operator's FORWARD or REVERSE switch commands.

The emitter of the bottom IGBT of the first half-bridge and cathode of the bottom SCR of the second half-bridge are connected together to the negative side of said DC source. The center point of the first half-bridge connects to a first armature terminal of said four is terminal DC motor via a second DC current transducer. The second armature terminal is connected to the center point of the second half-bridge.

The first field terminal of said four terminal DC motor connects to the positive side of said DC source. A diode is connected across the motor field terminals such that its cathode is connected to the positive terminal of said DC source to provide a free-wheel current path.

During forward tramming, the top IGBT of the first half-bridge and bottom SCR of the second half-bridge are ON, with said top IGBT providing forward motor current control by way of PWM mode control responsive to operator's current commands. Said second CT provides current feedback to the circuit controlling said top IGBT.

During reverse tramming, the bottom IGBT of the first half-bridge and top SCR of the second half-bridge are ON, with said bottom IGBT providing reverse motor current control by way of PWM mode control responsive to operator current commands. Said second CT provides current feedback to the circuit controlling said bottom IGBT.

The compact, contactorless multi-motor controller of the present invention offers significant improvements over the older technologies. It is rugged, offering enhanced reliability and serviceability. The unit is easily handled and less subject to damage during transportation to the vehicle. It is efficient, generates little heat, is very well suited for mounting inside an explosion proof box, and its use results in decreased downtime in the event of a controller malfunction. It is flexible and can be adapted for either manual or semi-automated operation. Battery energy is conserved, particularly if the controller's pump ON/OFF feature is used during vehicle idle time.

BRIEF DESCRIPTION OF THE DRAWINGS

FIG. 5a depicts a typical pump motor current reference signal, whereas FIG. 2b shows a typical pump motor current curve.

DETAILED DESCRIPTION OF THE INVENTION

Figure 2:
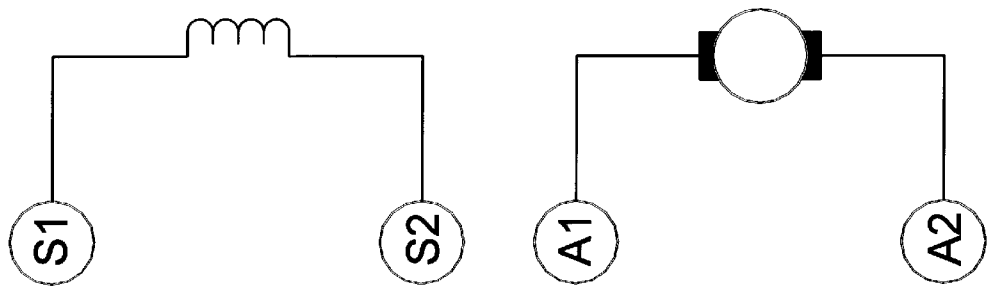
FIG. 2 shows the schematic of a conventional four-terminal series wound DC motor that may be used in connection with the present invention.
Figure 1:
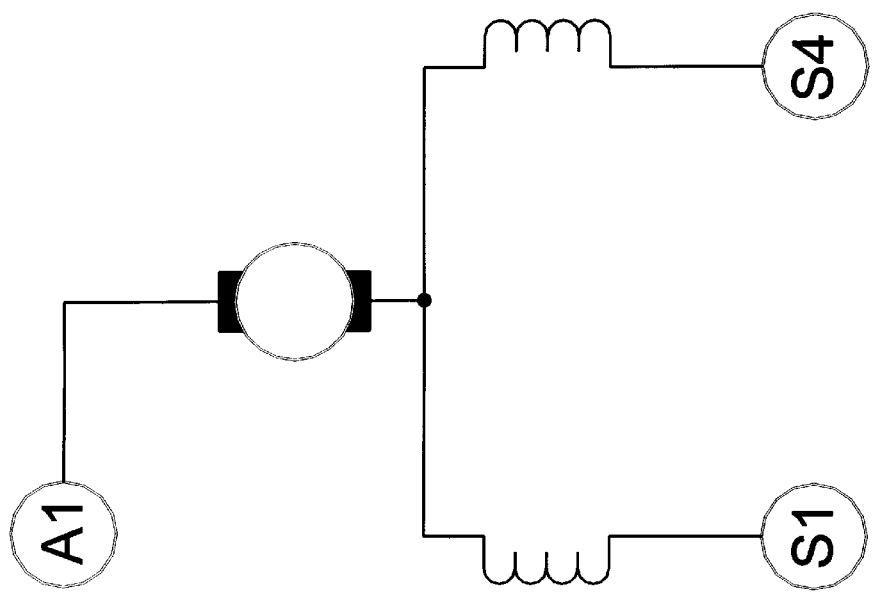
FIG. 1 shows the schematic of a three-terminal series wound DC motor of the type required by many prior art traction motor controllers.
Figure 3:
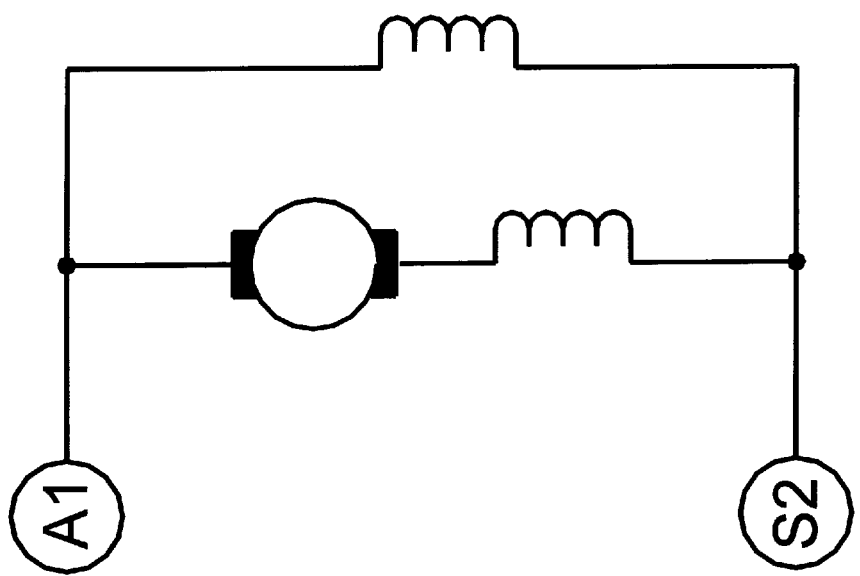
FIG. 3 shows the schematic of a conventional two-terminal compound wound DC motor that may be used in connection with the present invention.

The contactorless multi-motor controller consists of at least two parts: a pump motor starter, and a traction motor controller. FIG. 1 shows a schematic of a three terminal, series wound DC motor with dual series fields used with certain contactorless controllers referred to in the prior art. The three terminal, series wound DC motor is used in the prior art and is undesirable because it must be specially manufactured and is more costly. FIG. 2 shows a schematic of a four terminal, series wound DC motor of conventional design. This is the most common DC motor embodiment used in battery-powered vehicles, and may be used in connection with the present invention. FIG. 3 shows a schematic of a two terminal, compound wound DC motor used for pumps and compressors. A compound wound motor's RPM is less load-dependent than that of a series wound motor, and provides acceptable pump speed under light and heavy pump load conditions.

Figure 4:
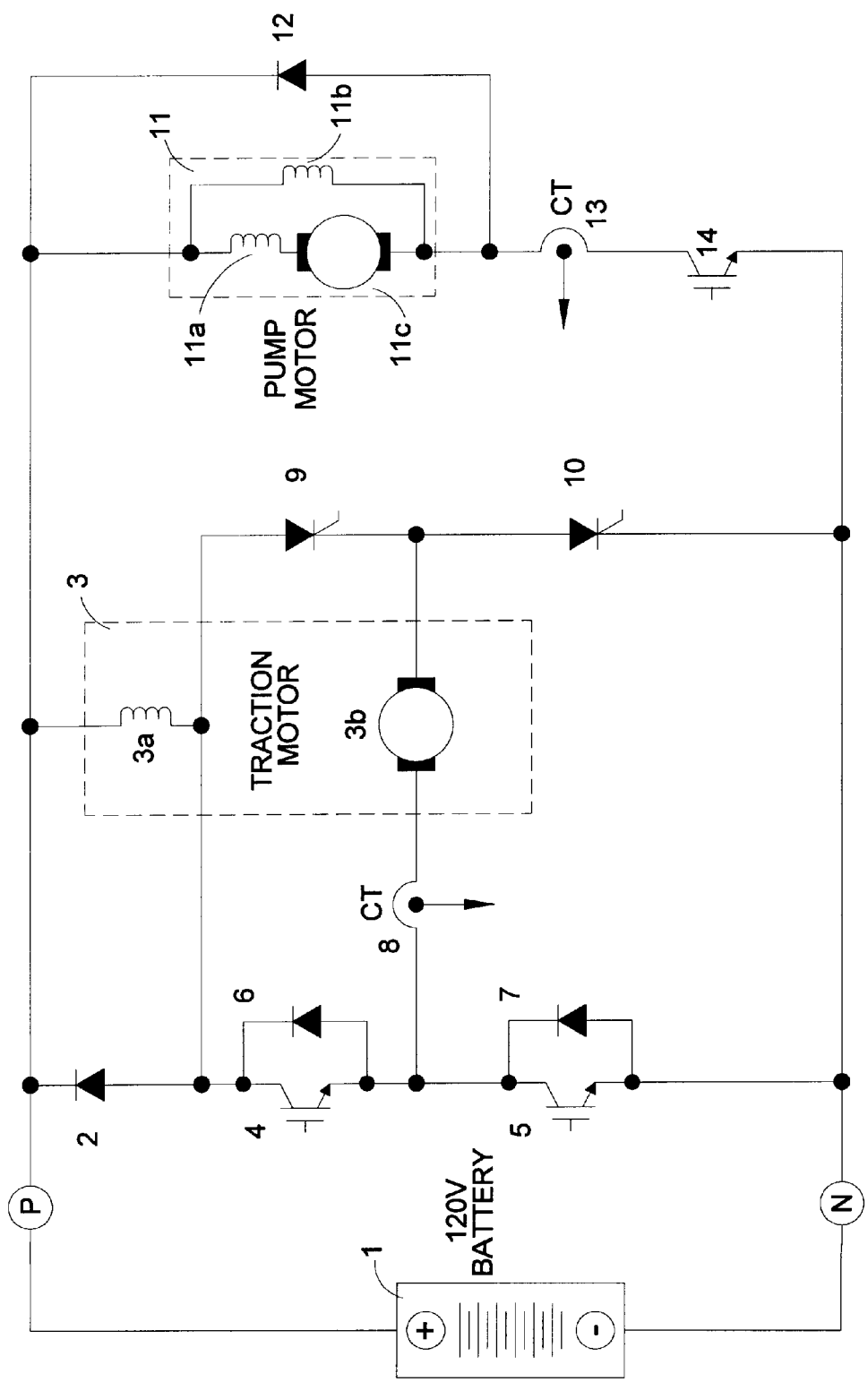
FIG. 4 shows a simplified electrical schematic of the power circuit of a preferred embodiment of a contactorless multi-motor controller according to the invention.

FIG. 4 shows a simplified power schematic of a preferred embodiment of the invention. In this embodiment, current through the field 3a of the traction motor 3 is unidirectional, but current through its armature 3b is reversible to reverse motor rotation. Current through the fields 11a, 11b and armature 11c of the pump motor 11 are always in the same direction, since pump rotation is only in one direction.

A. Pump Motor Control

Figure 5:
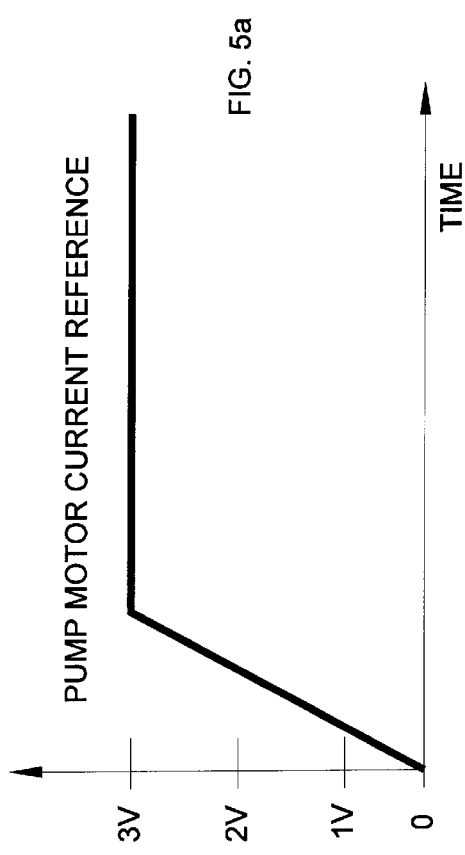
FIG. 5 shows a typical current reference and current profile for the pump motor during starting.
Figure 5:
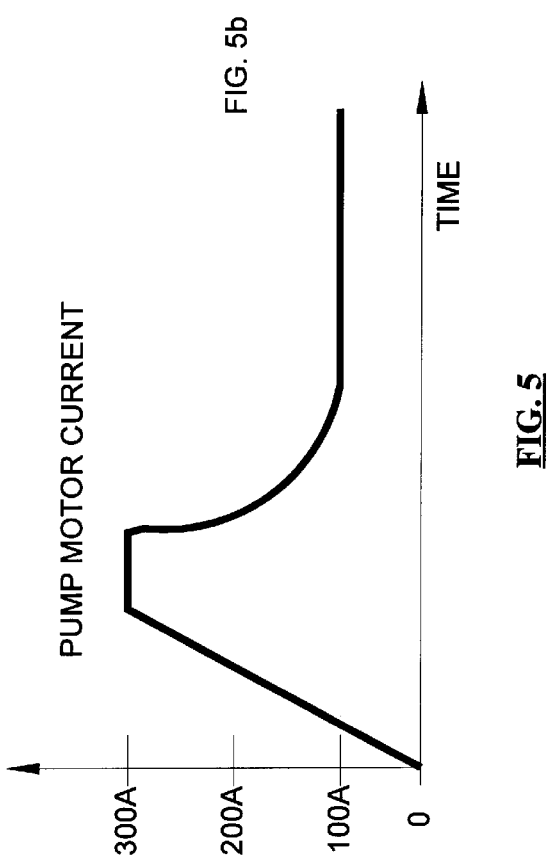
Figure 6:
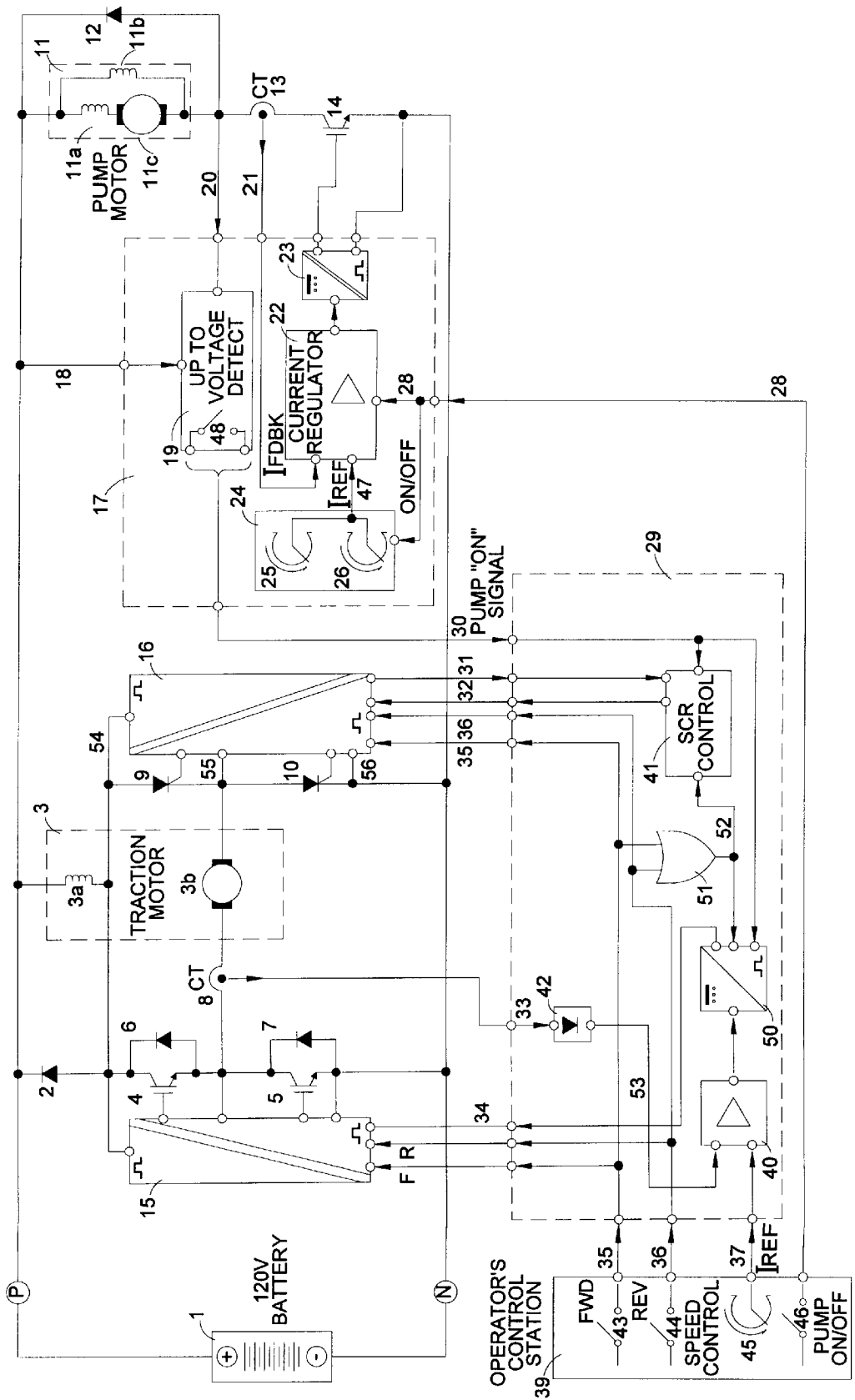
FIG. 6 shows the functional circuit diagram associated with the power schematic of FIG. 4.

Referring again to FIG. 4, when the pump motor 11 is first turned ON, a pump current reference signal such as that depicted in FIG. 5a is provided to the control circuit block 17 (shown in FIG. 6). In response, IGBT 14 operates in PWM mode to provide ramped motor current with a typical current profile shown in FIG. 5b. As soon as the pump motor 11 reaches full speed, its current drops to 100 A or less and full supply voltage appears across its terminals. This condition is detected and a signal is then sent to the traction motor controller 29 (shown in FIG. 6) to prepare it for tramming.

Current paths during the starting period are as follows: When IGBT 14 first turns ON, current flows from terminal P through pump motor 11, CT 13, and IGBT 14 to terminal N. When IGBT 14 turns OFF, free-wheel current due to energy stored in the inductance of pump motor 11 flows through diode 12.

B. Traction Motor Control

Still referring to FIG. 4, when pump motor 11 is running, an enabling signal is sent to traction motor controller 29.

To tram forward, SCR 10 is switched ON, and IGBT 4 operates in PWM mode to control the current through traction motor 3 in response to the operator's current commands. Current feedback is via CT 8. When IGBT 4 turns ON, current flows form terminal P, through motor field 3a, IGBT 4, CT 8, armature 3b, SCR 10 to terminal N. When IGBT 4 turns OFF, free-wheel current due to energy stored in the inductance of field 3a flows through diode 2. Free-wheel current due to energy stored in the inductance of armature 3b flows from armature 3b, SCR 10, diode 7, CT 8, back to armature 3b.

To tram reverse, SCR 9 is turned ON, and IGBT 5 operates in PWM mode to control the current through traction motor 3, in response to the operator's current commands. As before, current feedback is via CT 8. When IGBT 5 turns ON, current flows from terminal P through field 3a, SCR 9, armature 3b, CT 8, IGBT 5 to terminal N. When IGBT 5 turns OFF, free-wheel current due to energy stored in the inductance of field 3a flows through diode 2. Free-wheel current due to energy stored in the inductance of armature 3b flows from armature 3b to CT 8, diode 6, SCR 9, back to armature 3b.

FIG. 6 illustrates the function blocks contained in the circuit controlling the power devices of FIG. 4. Referring now to FIG. 6, the control circuit accompanying IGBT 14 is contained within circuit block 17. Module 24 contains ramp time adjustment potentiometer 26 and maximum pump motor current setting potentiometer 25. From the operator control panel 39, when the operator switches "Pump ON/OFF" switch 46 ON, a signal is transmitted on signal line 28 to cause module 24 to output a ramped 0 to 3 V signal depicted in FIG. 5a. Current regulator 22 is prepared to accept the Iref signal on signal line 47 as soon as line 28 is energized. Current regulator 22 outputs a signal to PWM generator/IGBT driver module 23 to rapidly switch IGBT 14 ON/OFF in order to maintain current in pump motor 11 according to the input command of FIG. 5a. Current feedback is via line 21 connected to CT 13. As the pump motor ramps up it quickly reaches full speed as soon as its counter EMF is the same as the supply voltage between P and N. At this point, IGBT 14 is fully ON, the motor current does not follow the input current command anymore and it drops to satisfy pump load requirements. Pump motor 11 voltage is measured by "up to voltage detect" module 19 inside module 17 via connections 18 and 20. When full voltage is detected, small-signal relay switch 48 inside module 19 closes to prepare the traction motor control circuit 28 for tramming operation via an enabling signal on signal line 30.

The control circuit accompanying the power devices controlling traction motor 3 is contained within circuit block 29.

Circuit block 29 is prepared to allow tramming operation when it receives a "pump ON" signal via signal line 30. To tram forward, the operator closes switch 43 which sends a "forward" enabling signal to IGBT 4, which is controlled by a driver in dual IGBT driver block 15 via line 35. The enabling signal is further sent to dual SCR trigger module 16 via line 35 and to OR gate 51. The output of OR gate 51 now enables PWM generator module 50 and SCR control module 41 via signal line 52. SCR 10 is turned ON, via signal line 32, provided signal line 31 confirms that SCR 9 is OFF. This condition is confirmed by the presence of voltage across SCR 9 which is detected in module 16 via connections 54 and 55.

Upon confirmation that SCR 10 is being triggered, IGBT 4 will be able to control traction motor and current by means of PWM action.

Current regulator 40 receives a current command (Iref) from operator's control potentiometer 45 via signal line 37. This signal is compared to a current feedback signal from CT 8 which is connected to an "absolute value rectifier" module 42 via signal line 33. This rectifier module is necessary because CT 8's output signal would be positive for forward tramming and negative for reverse tramming. This current feedback signal to current regulator 40 must be unipolar irrespective of motor current polarity in order to correspond to the unipolar signal on Iref line 37. Accordingly, a unipolar current feedback signal will appear on signal line 53.

The current regulator 40 output is connected to PWM generator module 50 and this signal is connected to dual IGBT driver module 15 and routed to IGBT 4 which together with SCR 10, will cause the desired current to flow through motor 3.

To tram reverse, the operator closes switch 44 to enable IGBT 5 driver in dual driver module 15 and turn ON SCR 9 trigger in module 16 via signal line 36.

The output of OR gate 51 is enabled to prepare PWM module 50 and SCR control 41, provided SCR 10 is OFF, as confirmed by the presence of voltage across it. This condition is detected inside module 16 via signal lines 55 and 56. Upon confirmation that SCR 9 is being triggered, IGBT 5 will be able to control motor current in a similar fashion as described previously for forward tramming.

Figure 7:
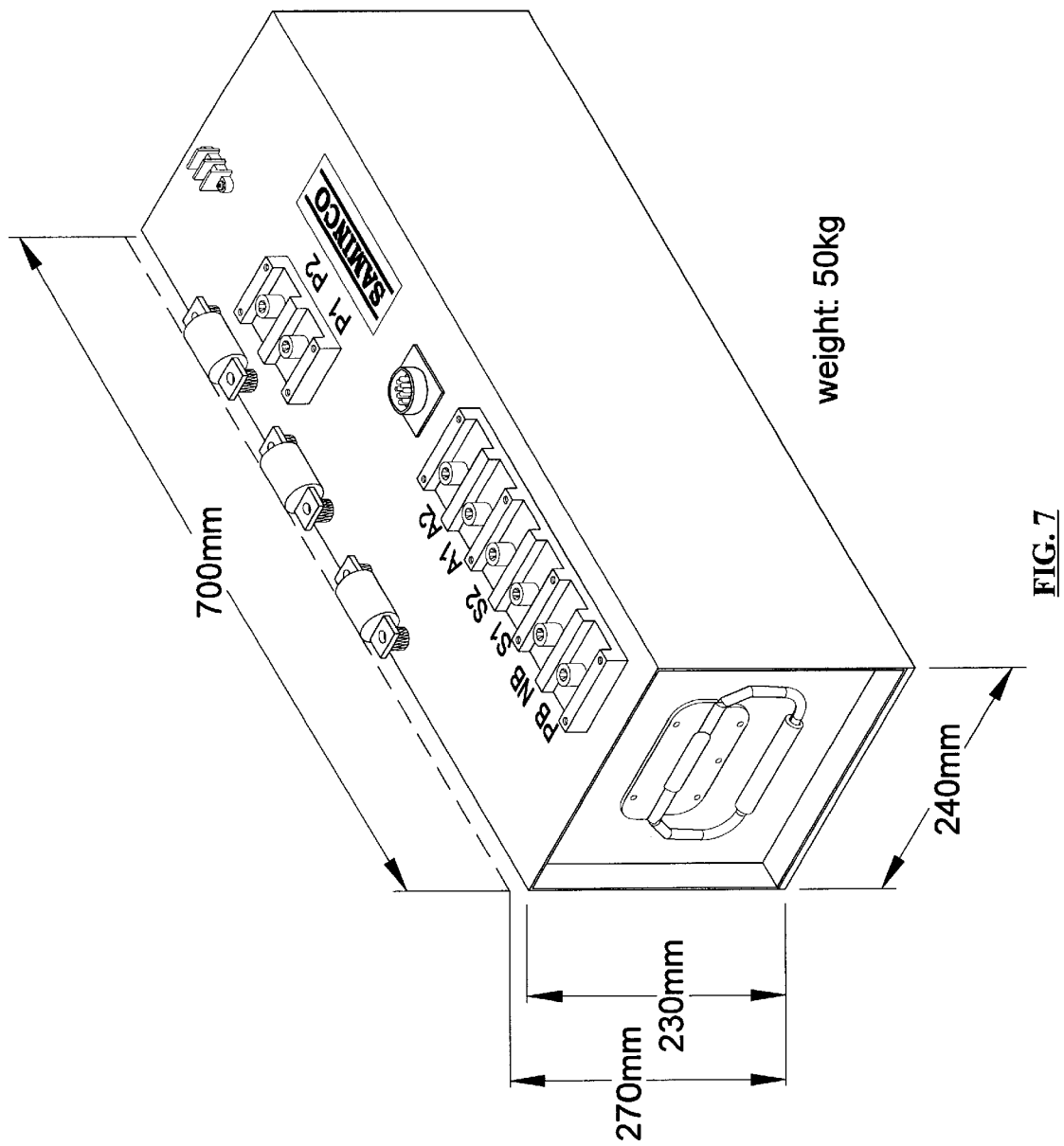
FIG. 7 shows an enclosure housing the embodiments described in FIG. 4 and FIG. 6.

FIG. 7 shows a compact, portable enclosure housing a contactorless controller for a four terminal series wound traction motor and a contactorless pump motor starter both described in FIG. 4 and FIG. 6. Terminals PB and NB connect to the battery, P1 and P2 to a two wire compound wound DC pump motor, and S1, S2, A1, and A2 to a four terminal DC series wound traction motor. The enclosure has two handles and weighs approximately 50 kg, allowing it to be carried by one or two persons.

The solid-state pump motor starter can be frequently turned ON and OFF since there is no excess heat in the motor nor starter during the controlled starting function. Thus, when the vehicle is idle, its pump motor can be switched OFF, either manually, or by means of a signal from the traction controller which signals back to the starter that the traction motor has not been energized for a pre-programmed period, typically 10 seconds.

This timing function, as well as interfacing with the operator's controls are often achieved using a PLC, powered from an isolated 24V supply inside the multi-mode controller previously described.

Having described a preferred embodiment, it will be clear to those skilled in the art of solid-state motor control that the circuit control functions described in FIG. 6 could be achieved using appropriate analog, digital, or microprocessor devices.

Moreover, the IGBT based PWM control devices of FIG. 4 and FIG. 6 could be replaced by MOSFETS, BJT's, or IGCT's and their appropriate driver circuits. The SCR based direction switches could be replaced by MOSFETS, BJT's, IGBT's, IGCT's and their appropriate driver circuits.

The embodiments of FIG. 4 and FIG. 6 could readily be configured to include the control of a second traction motor in one enclosure to provide a contactorless multi-motor controller for a vehicle with dual traction motors and one pump motor.

Definitions

1. TRACTION MOTOR: motor providing motion power to rubber tired, tracked, or railed vehicles.
2. AUXILIARY MOTOR: motor providing power to a hydraulic pump, water pump, compressor, fan, or conveyor.
3. IGBT: Isolated Gate Bipolar Transistor.
4. IGCT: Isolated Gate Controlled Thyristor.
5. BJT: Bipolar Junction Transistor.
6. SCR: Silicon Controlled Rectifier, or Thyristor.
7. MOSFET: Metal Oxide Silicon Field Effect Transistor.
8. SOLID STATE SWITCHING POWER DEVICE: A semiconductor switch capable of switching large currents. Examples include: IGBT's, IGCT's, SCR's, BJT's or MOSFETS.
9. CONTACTOR: Solenoid (coil)-activated electromechanical switch capable of conducting large currents (used in prior art).
10. SOLID STATE CONTROLLER: A motor controller containing at least one Solid-State Power Device to control motor current by means of PWM action. Motor direction control may be achieved using Contactors or other Solid_State Power Devices.
11. PWM: Pulse Width Modulation control—current is controlled by the rapid ON/OFF switching of solid state power semiconductors (100 Hz to 10,000 Hz).
12. TRAMMING: the act of propelling the vehicle by means of its traction motor or motors.
13. PLC: Programmable Logic Controller
14. CT: DC current transducer, using a Hall-Effect or Magneto-resistive element to provide a galvanically isolated voltage signal proportional to the current through the transducer.
15. HYBRID H-BRIDGE: A hybrid H-bridges comprises two half bridges. The first half bridges comprises two switching power devices and the second half bridge consists of two latching power devices.
16. SWITCHING POWER DEVICE: Semiconductor device capable of switching a direct current OFF to ON and ON to OFF. Examples are: BJT's, IGBT's, IGCT's, MOSFETS.
17. LATCHING POWER DEVICE: Semiconductor device capable of switching direct current from OFF to ON only. The device resets itself as soon as the current through it goes to zero for more than 100 microseconds. An example is the SCR.

What is claimed is:

1. A contactorless multi-motor control system for a battery powered vehicle comprising:
    a DC auxiliary motor having first and second terminals;
    a contactorless auxiliary motor controller having first and second connecting terminals, which are connected electrically to said first and second terminals of said auxiliary motor;
    a series wound DC traction motor in electrical communication with said auxiliary motor having four terminals including first and second field terminals and first and second armature terminals, said first armature terminal having first and second choppers electrically connected therewith, and said second armature terminal having first and second thyristors electrically connected therewith, wherein activation of said first chopper and said second thyristor causes a forward current flow between said first and second armature terminals, and activation of said second chopper and said first thyristor causes a reverse current flow between said first and second armature terminals; and
    a contactorless, bidirectional current controller coupled to said traction motor.

2. The multi-motor control system of claim 1 wherein said auxiliary motor controller comprises a controlled solid-state switching power device and no starting resistor.

3. The multi-motor control system of claim 1 wherein said traction motor controller requires no speed sensing transducers.

4. The multi-motor control system of claim 1 wherein said auxiliary motor controller comprises an IGBT having a collector.

5. The multi-motor control system of claim 4 wherein said first connecting terminal of said auxiliary motor controller is electrically connected to a positive DC source, and said second connecting terminal of said auxiliary motor controller is electrically connected to said collector of said IGBT of said auxiliary motor controller.

6. The multi-motor control system of claim 1 wherein said traction motor controller comprises first and second half bridges, wherein said first half bridge comprises top and bottom IGBT's, each of said IGBT's having a collector and an emitter.

7. The multi-motor control system of claim 6 wherein said second half bridge comprises top and bottom SCR's, each of said SCR's having a cathode and an anode.

8. The multi-motor control system of claim 7 wherein said emitter of said top IGBT is electrically coupled to said collector of said bottom IGBT.

9. The multi-motor control system of claim 8 wherein said cathode of said top SCR is electrically coupled to said anode of said bottom SCR.

10. The multi-motor control system of claim 6 wherein said collector of said top IGBT and said anode of said top SCR are connected to said second field terminal of said traction motor.

11. The multi-motor control system of claim 10 wherein said first half-bridge controls a current through said traction motor by PWM.

12. The multi-motor control system of claim 1 wherein said auxiliary controller is a hydraulic pump motor.

13. The multi-motor control system of claim 1 wherein said traction motor controller generates an idle signal indicating when said traction motor has been idled for at least a pre-programmed time period.

14. The multi-motor control system of claim 13 wherein said auxiliary motor controller turns off the auxiliary motor responsive to receiving said idle signal from said traction motor controller.

15. The multi-motor control system of claim 1 comprising a second contactorless traction controller for controlling a second four-terminal, series-wound DC traction motor.

16. The multi-motor control system of claim 1 wherein said traction motor controller and said auxiliary motor controller are housed in a single enclosure.

17. The multi-motor control system of claim 1 wherein said system further comprises a microprocessor electrically coupled to said auxiliary motor controller and said traction motor controller whereby an operator may control the operation of the multi-motor control system.

18. The multi-motor control system of claim 17 wherein said microprocessor is a micro-control unit.

19. The multi-motor control system of claim 17 wherein said microprocessor is a digital signal processor.

* * * * *

UNITED STATES PATENT AND TRADEMARK OFFICE
CERTIFICATE OF CORRECTION

PATENT NO. : 6,157,148
DATED : December 5, 2000
INVENTOR(S) : Posma

It is certified that error appears in the above-identified patent and that said Letters Patent are hereby corrected as shown below:

Column 8, line 53, delete the numeral "6" and insert therefor the numeral --7--.

Signed and Sealed this

Twenty-ninth Day of May, 2001

*Attest:*

NICHOLAS P. GODICI

*Attesting Officer*      *Acting Director of the United States Patent and Trademark Office*